UNITED STATES PATENT OFFICE.

JAMES McEVOY, OF PITTSBURG, PENNSYLVANIA.

IMPROVEMENT IN SOAP COMPOSITIONS.

Specification forming part of Letters Patent No. 173,982, dated February 22, 1876; application filed January 28, 1876.

*To all whom it may concern:*

Be it known that I, JAMES MCEVOY, of Pittsburg, in the county of Allegheny and State of Pennsylvania, have invented certain new and useful Improvements in Compound for Soap; and I do hereby declare that the following is a full, clear, and exact description thereof, reference being had to the accompanying drawings, and to the letters of reference marked thereon, which form part of this specification.

The nature of my invention consists in a compound for soap, as will be hereinafter more fully set forth.

This compound is composed of gum-kauri, borate of manganese, shell-lime, rosin, soda-ash, salt, and caustic soda; and is prepared in the following manner, and in about the following proportions:

Two pounds of gum-kauri, or other similar gums, is fused thoroughly, and, when cool, is ground on any ordinary bark-mill, after which one ounce borate of manganese and one ounce shell-lime are added thereto. Ten pounds of rosin is placed over a brisk fire, and boiled for about two hours, to drive off all fusel-oil, after which it is added to the former mixture, and the whole boiled over a moderate fire, and well mixed, for about one hour.

One pound soda-ash, one pound salt, and ten pounds caustic soda are placed in an iron pot over a brisk fire, dissolved, mixed well, and cooked for about one hour; after which it is mixed in a separate vessel with the former mixture while all is hot. After the entire compound has been well and thoroughly mixed it is spread in iron pans, and allowed to stand until it is cool and dried hard. It is then ground in a bark-mill, and afterward in a burr-mill, when it is put up in tin, paste-board, or iron boxes of any desired size, ready for use.

The proportions may be varied, if desired.

Having thus fully described my invention, what I claim as new, and desire to secure by Letters Patent, is—

The within-described soap compound, consisting of gum-kauri, borate of manganese, shell-lime, rosin, soda-ash, salt, and caustic-soda, substantially as herein set forth.

In testimony that I claim the foregoing as my own I affix my signature in presence of two witnesses.

JAMES McEVOY.

Witnesses:
WM. A. HOLMAN,
CHARLES HAID.